Aug. 19, 1958 W. A. RINGLER 2,848,136
MULTI-CELL BOTTLE CARRIERS
Filed Oct. 11, 1952 9 Sheets-Sheet 4

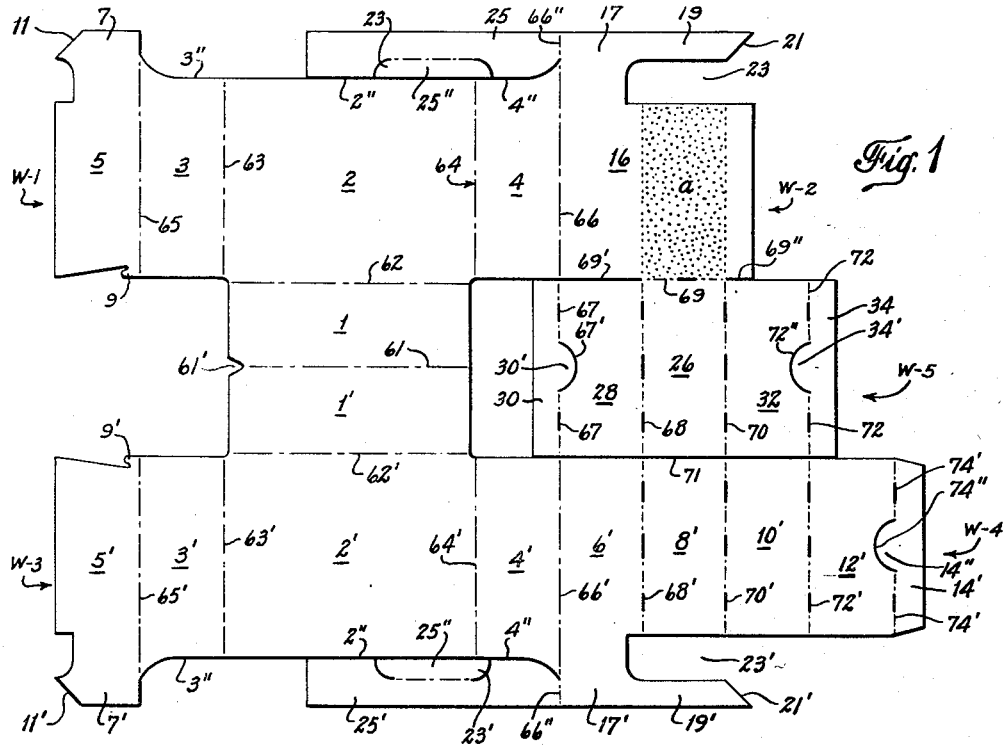
Fig. 1
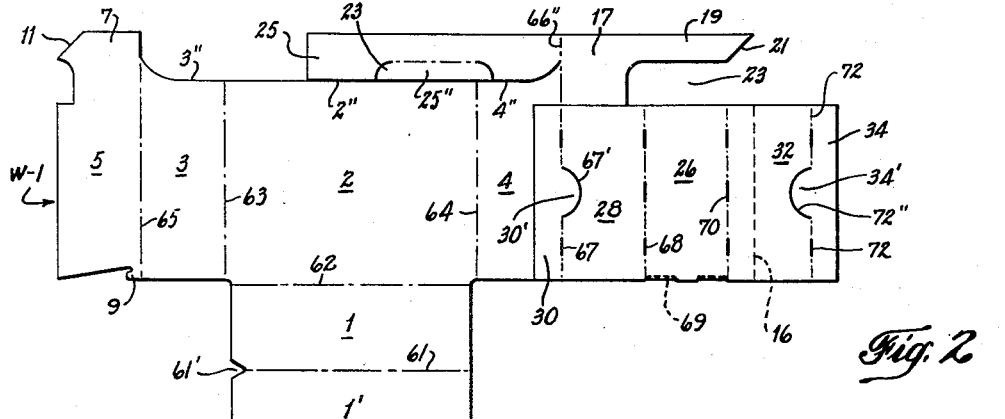
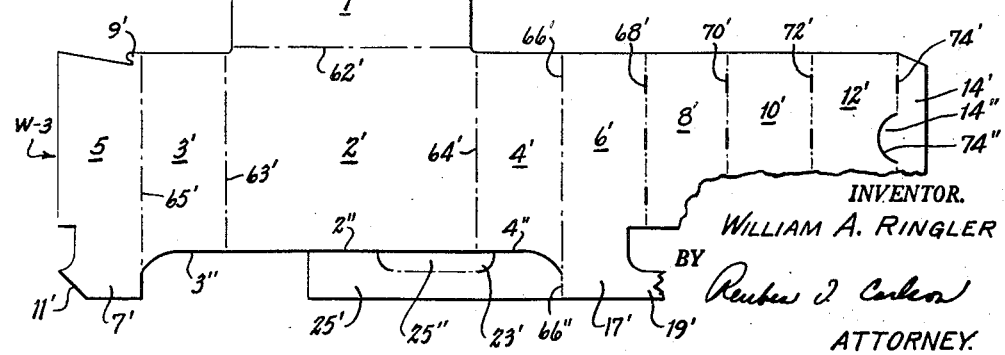
Fig. 2
INVENTOR.
WILLIAM A. RINGLER
BY
ATTORNEY.

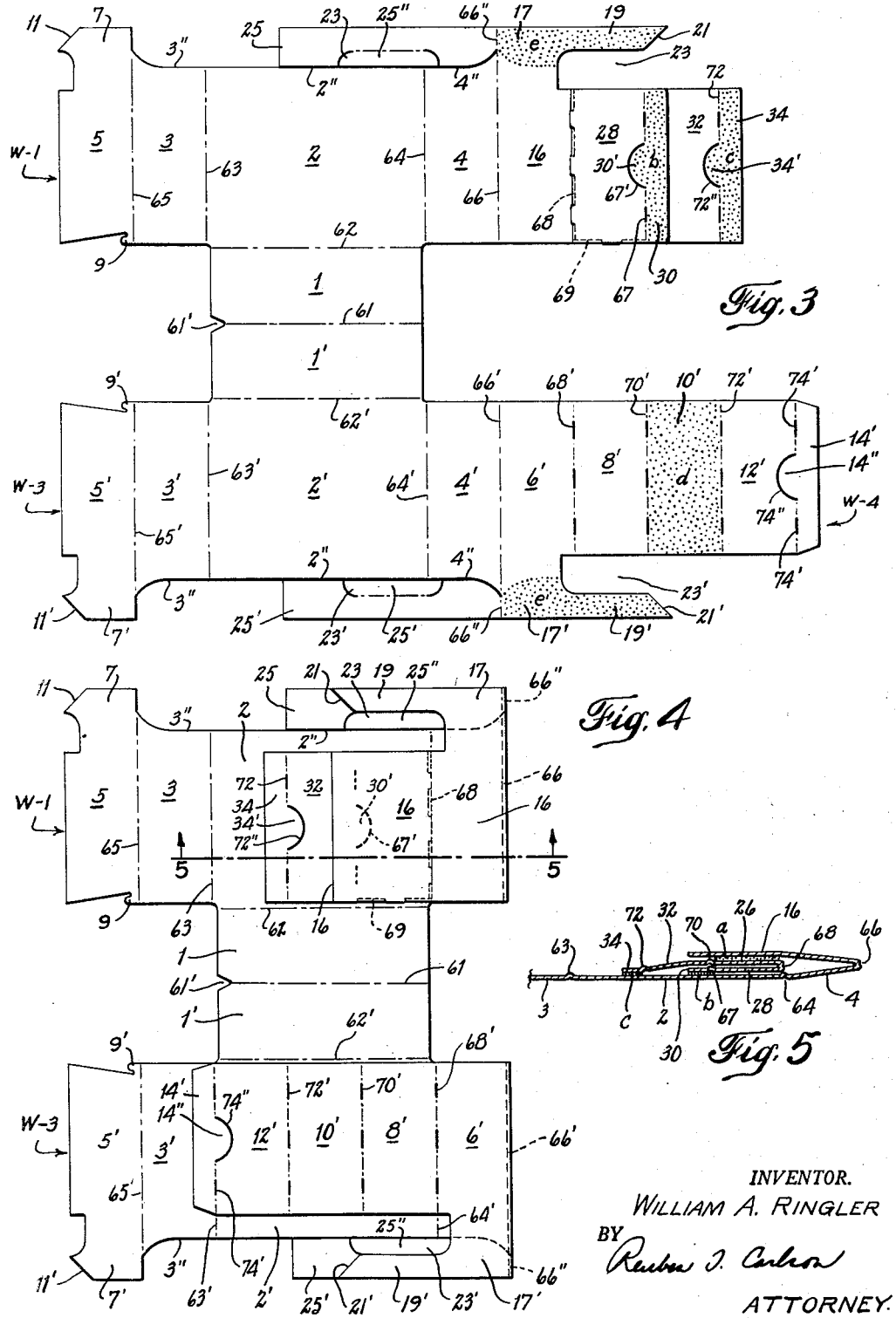

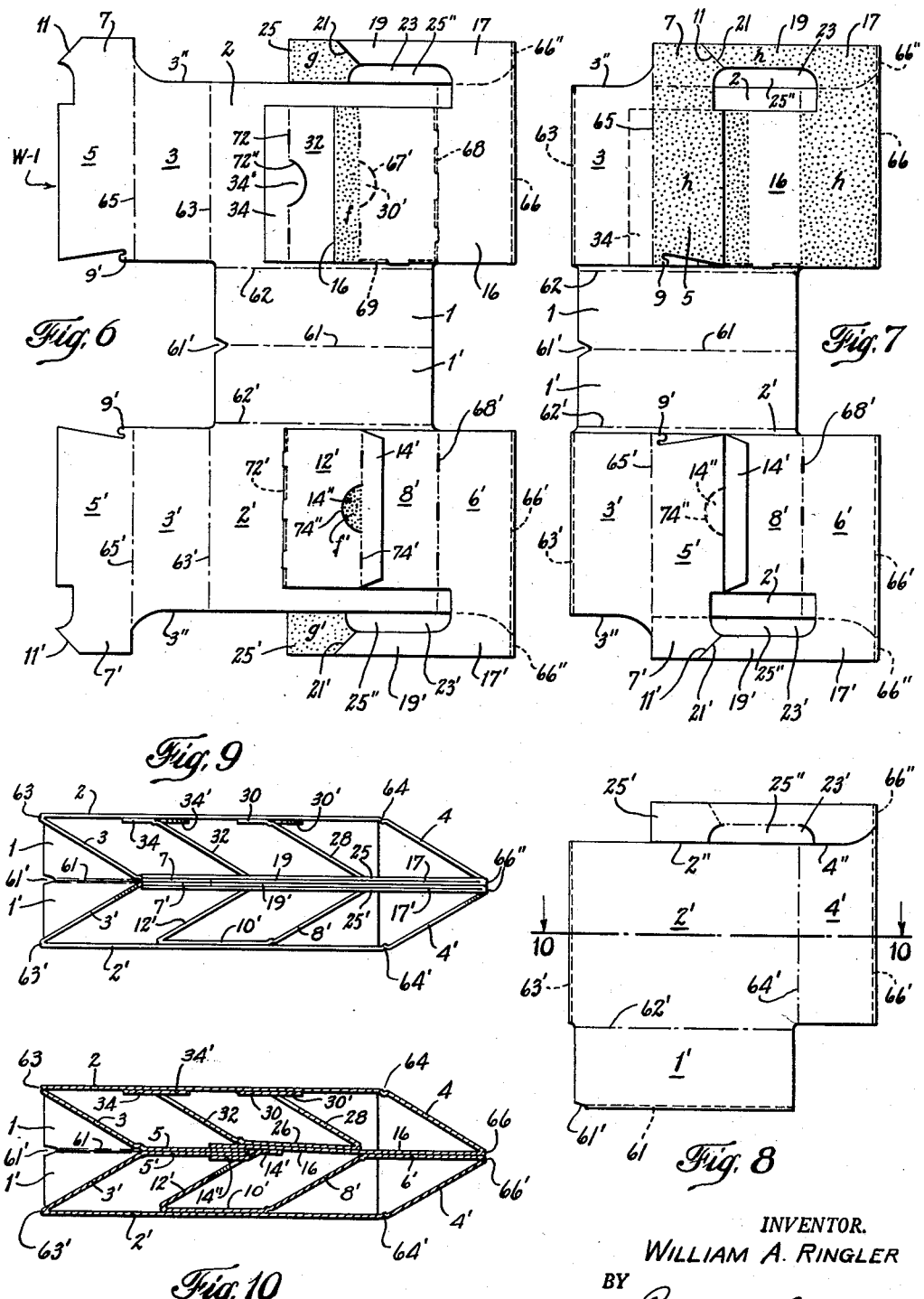

INVENTOR.
WILLIAM A. RINGLER
BY
ATTORNEY.

Aug. 19, 1958  W. A. RINGLER  2,848,136
MULTI-CELL BOTTLE CARRIERS
Filed Oct. 11, 1952  9 Sheets-Sheet 5
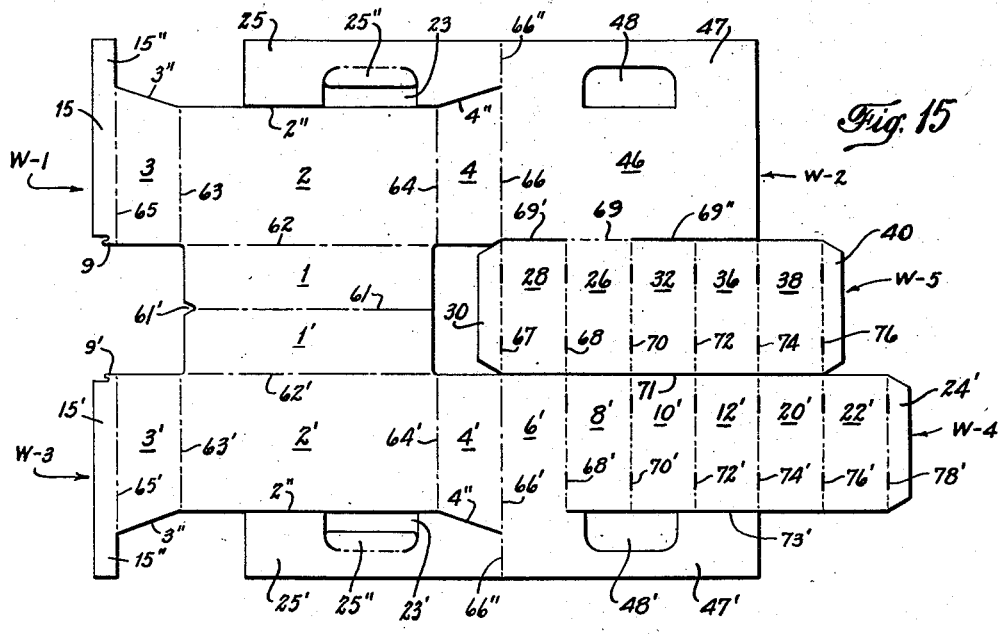
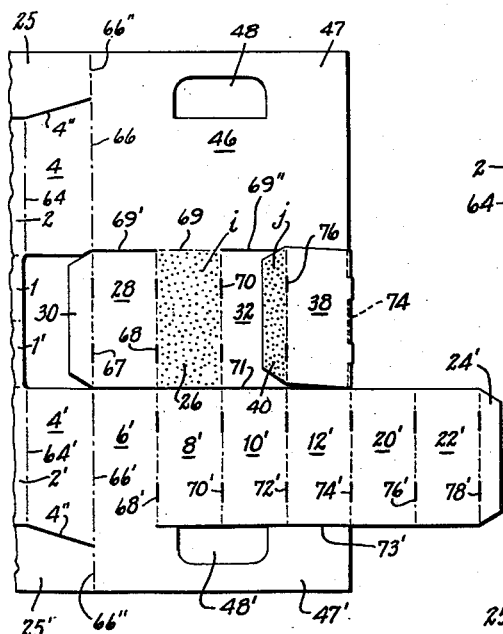
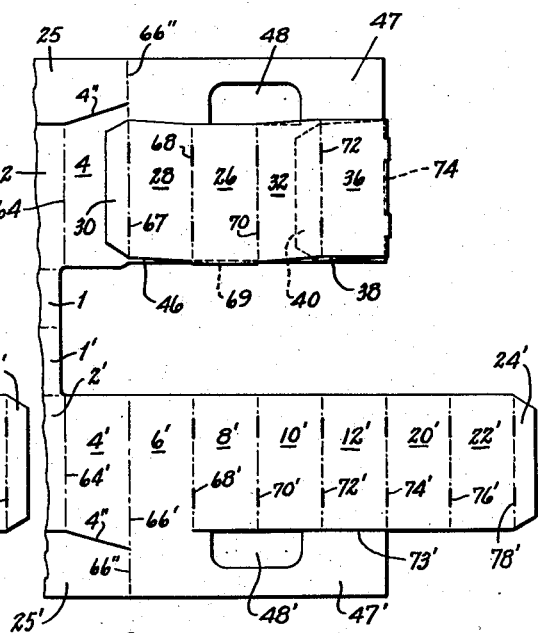
INVENTOR.
WILLIAM A. RINGLER
BY
ATTORNEY.

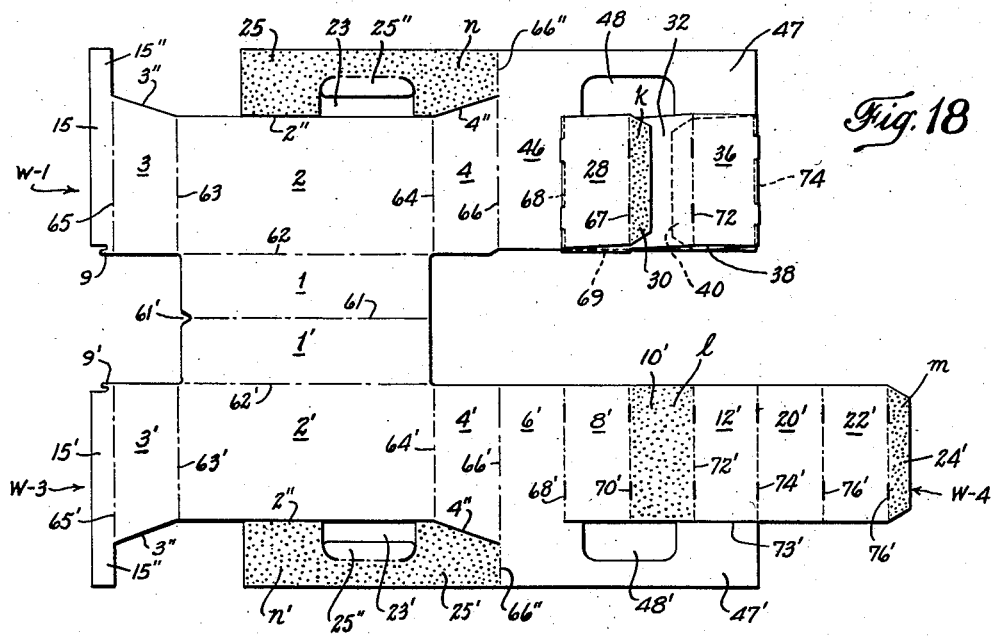
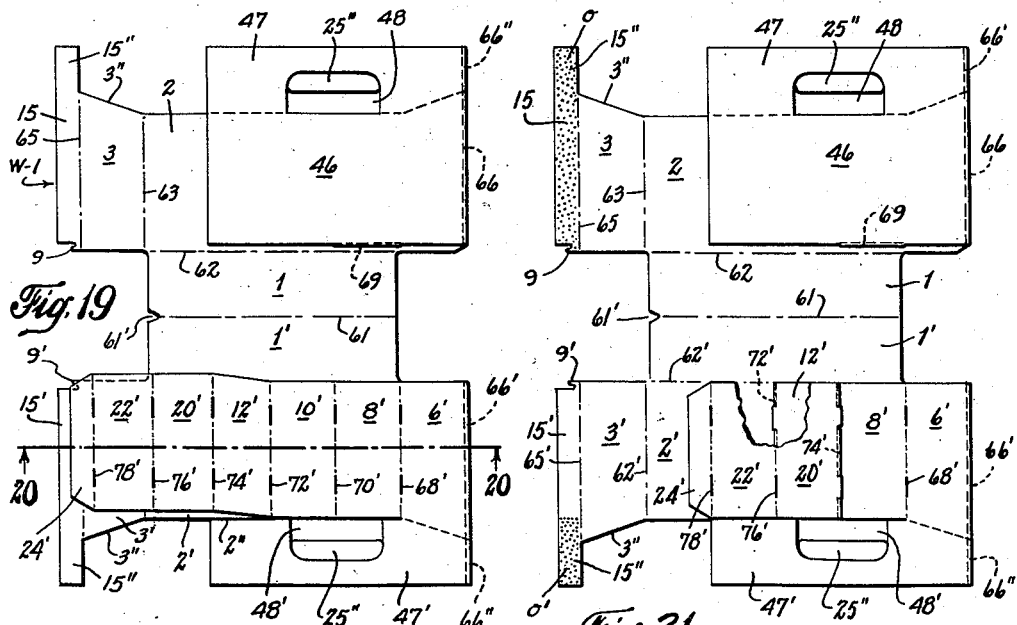
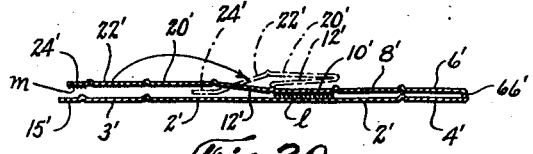

Aug. 19, 1958  W. A. RINGLER  2,848,136
MULTI-CELL BOTTLE CARRIERS
Filed Oct. 11, 1952  9 Sheets-Sheet 7
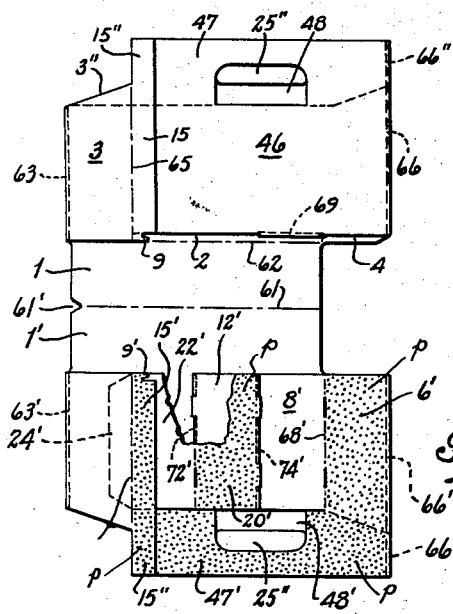
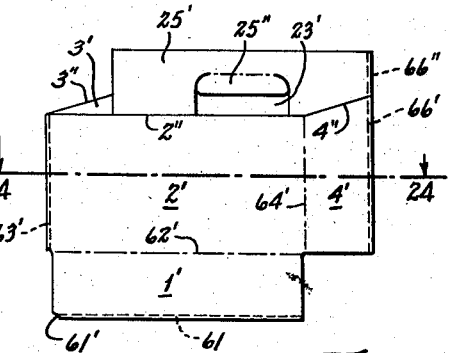
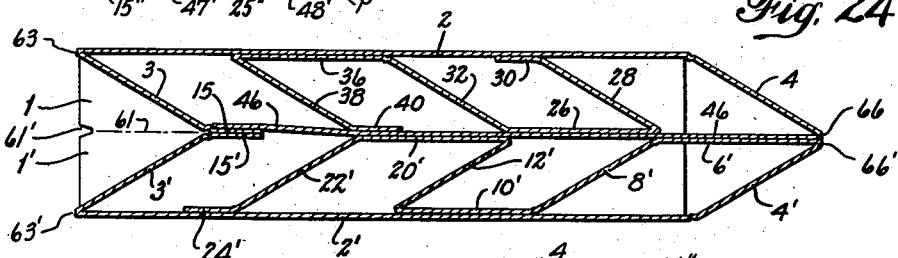
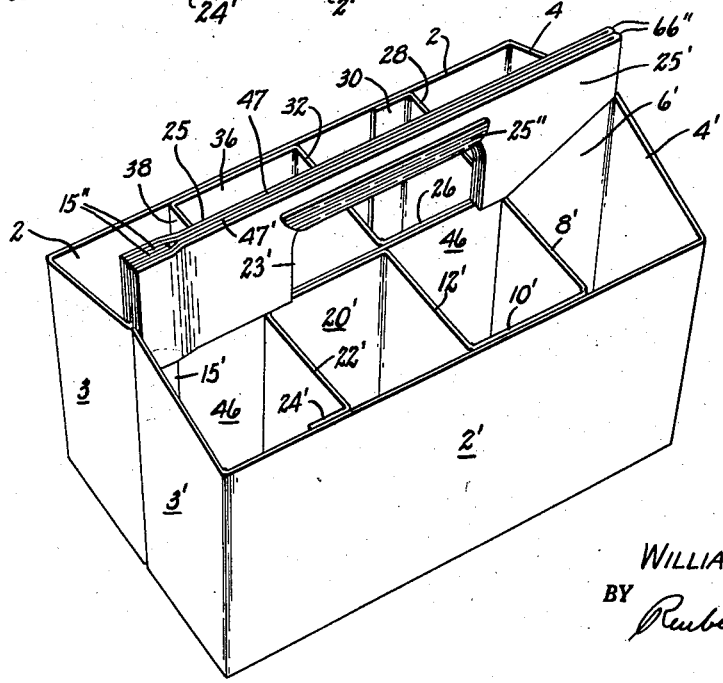
Fig. 22
Fig. 23
Fig. 24
Fig. 25
INVENTOR.
WILLIAM A. RINGLER
BY
ATTORNEY.

INVENTOR.
WILLIAM A. RINGLER
BY
ATTORNEY.

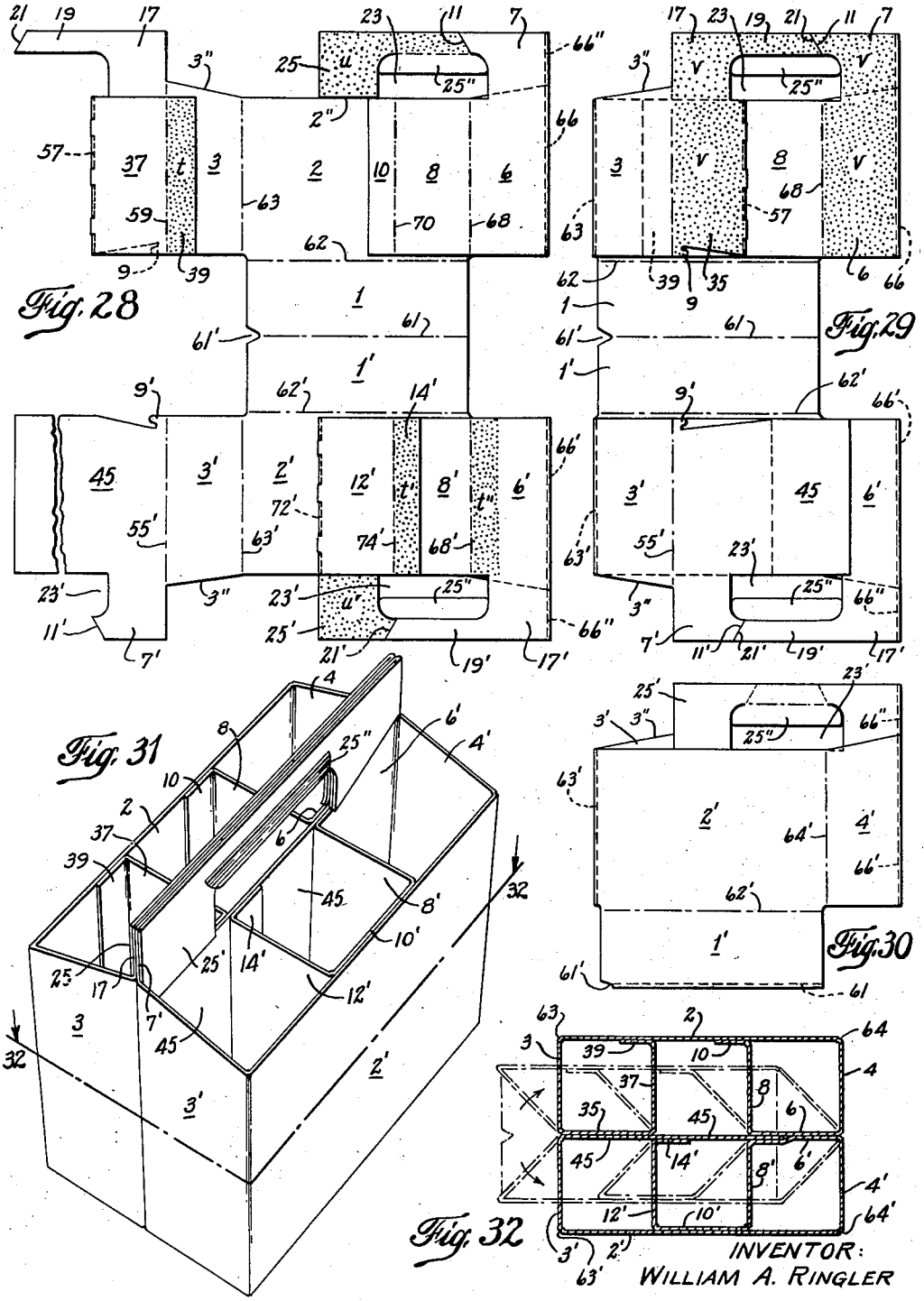

United States Patent Office 2,848,136
Patented Aug. 19, 1958

2,848,136

MULTI-CELL BOTTLE CARRIERS

William A. Ringler, Wayne, Pa., assignor, by mesne assignments, to The Diamond Match Company, New York, N. Y., a corporation of Delaware Application October 11, 1952, Serial No. 314,315

3 Claims. (Cl. 220—113)

This invention relates to multi-cell bottle carriers formed from paperboard or fiberboard sheet material and designed to permit flat collapse thereof for economical shipment and storage and convenient erection for bottle filling and transportation.

Multi-cell bottle carriers made in accordance with this invention are durable and lasting in use, convenient and attractive for consumer handling, rigid and sturdy when erected, and are designed to present substantially flat surface areas for the reception of attractive advertising decoration, provide cushioned protection and retainment of the bottles inserted in the cells thereof, can be manufactured economically and at low cost, and are otherwise designed to fully satisfy the exacting requirements of the beverage bottling and distributing industry.

These improved bottle carriers as erected present flat side and end wall panels which extend from the bottom panel thereof to any desired height. The end panels are connected to a plural ply center partition which divides the carrier into twin compartments, the center partition extending upwardly from the erected bottom panel and terminating in a handle part of four ply thickness. The cell forming cross partitions extend from the erected bottom panel upwardly to the approximate height of the side panels, thereby providing cushioned protection for the bottles contained in the cells thereof. The cross partitions are also connected to liner sections or flaps which are foldably secured to the adjacent interior faces of the side panels and center partition to provide a rigid and sturdy carrier construction which is convenient to collapse and erect.

These carriers may be designed to provide six or eight bottle receiving cells and are made from one-piece blanks which can be scored and cut with little resultant waste from selected paperboard or fiberboard stock sheets previously finished, printed and decorated on one side thereof only. These carrier blanks are so cut and formed as to permit high speed gluing and folding thereof into collapsed bottle carriers in a single pass of the blanks through a substantially standard folding and gluing machine.

Other objects and advantages of this invention will become apparent as the disclosure proceeds.

Although the characteristic features of this invention will be particularly pointed out in the claims appended hereto, the invention itself and the manner in which it may be carried out may be better understood by referring to the following description taken in connection with the accompanying drawings forming a part hereof, in which Fig. 1 is a plan view of a prepared blank which has been cut and scored in accordance with this invention for assembly into a twin compartment bottle carrier having three bottle receiving cells in each compartment, the cross partitions for one of the compartments being assembled from an intermediate wing of the blank;

Fig. 2 is a plan view of the blank shown in Fig. 1 as it would appear after the initial folding operation has been executed on the intermediate wing;

Fig. 3 is a plan view of the blank shown in Fig. 2 as it would appear after the second folding operation has been executed on the intermediate wing, areas of adhesive being shown applied to certain parts of the blank preparatory to execution of the next folding operation;

Fig. 4 is a plan view of the blank shown in Fig. 3 after the top and bottom wings at the right hand side of the blank have been folded in superimposed relation over the blank side panels;

Fig. 5 is a fragmentary cross sectional view taken horizontally through the blank along line 5—5 of Fig. 4, this view illustrating the relative position of certain folded sections of the blank;

Fig. 6 is a plan view of the blank shown in Fig. 4 as it would appear after the second folding operation has been executed on the overfolded right hand wing located at the lower end of the blank as shown in Fig. 6, areas of adhesive being shown applied to certain parts of the blank preparatory to execution of the next folding operation;

Fig. 7 is a plan view of the blank shown in Fig. 6 after the top and bottom wings at the left hand side of the blank have been folded into final position, an area of adhesive being shown applied to further parts of the blank preparatory to execution of the final folding operation;

Fig. 8 is a plan view of the blank shown in Fig. 7 as it would appear after the final folding operation has been executed thereon to produce a six bottle carrier in collapsed form;

Fig. 9 is a top plan view of the carrier shown in Fig. 8 as it would appear when undergoing erection expansion;

Fig. 10 is a horizontal cross sectional view of the assembled carrier as viewed along line 10—10 of Fig. 8 and as it would appear when undergoing erection expansion;

Fig. 15 is a plan view of another form of blank made in accordance with this invention which has been cut and scored to provide a twin compartment carrier having four article receiving cells in each compartment, with the three cross partitions for one compartment formed from an intermediate wing captured from material between adjacent top and bottom wings of the blank;

Fig. 16 is a fragmentary plan view of the blank shown in Fig. 15 as it would appear after the first folding operation has been executed upon the intermediate wing, areas of adhesive being shown applied to certain parts of the intermediate wing in preparation for the next folding operation;

Fig. 17 is another fragmentary plan view of the blank shown in Fig. 15 as it would appear after the second folding operation has been executed upon the intermediate wing;

Fig. 18 is a plan view of the blank as it would appear after the third folding operation has been executed upon the intermediate wing, this view also showing adhesive applied to certain areas of the blank prior to folding of the top and bottom wings at the right hand side of the blank;

Fig. 19 is a plan view of the blank shown in Fig. 18 as it would appear after the top and bottom wings at the right hand side of the blank have been folded over the adjacent side panels thereof;

Fig. 20 is a fragmentary cross section taken along line 20—20 of Fig. 19, this view illustrating in phantom lines the rebend fold to be given to a section of the overfolded bottom wing of the blank;

Fig. 21 is a plan view of the blank shown in Fig. 19 as it would appear after rebend folding of a section of the bottom wing thereof, this view also showing adhesive applied to further areas of the blank prior to execution of the next folding operation;

Fig. 22 is a plan view of the blank shown in Fig. 21 as it would appear after the top and bottom wings at the left hand side of the blank have been folded into final position, this view also showing areas of adhesive applied to further parts of the blank preparatory to execution of the final folding operation;

Fig. 23 is a plan view of the fully assembled eight cell carton in collapsed form as it would appear after the final folding operation has been executed upon the blank shown in Fig. 22;

Fig. 24 is a horizontal cross section taken through the carrier along line 24—24 of Fig. 23 as it would appear when undergoing erection expansion;

Fig. 25 is a perspective view of this eight cell carrier as it would appear when fully erected;

Figure 26:
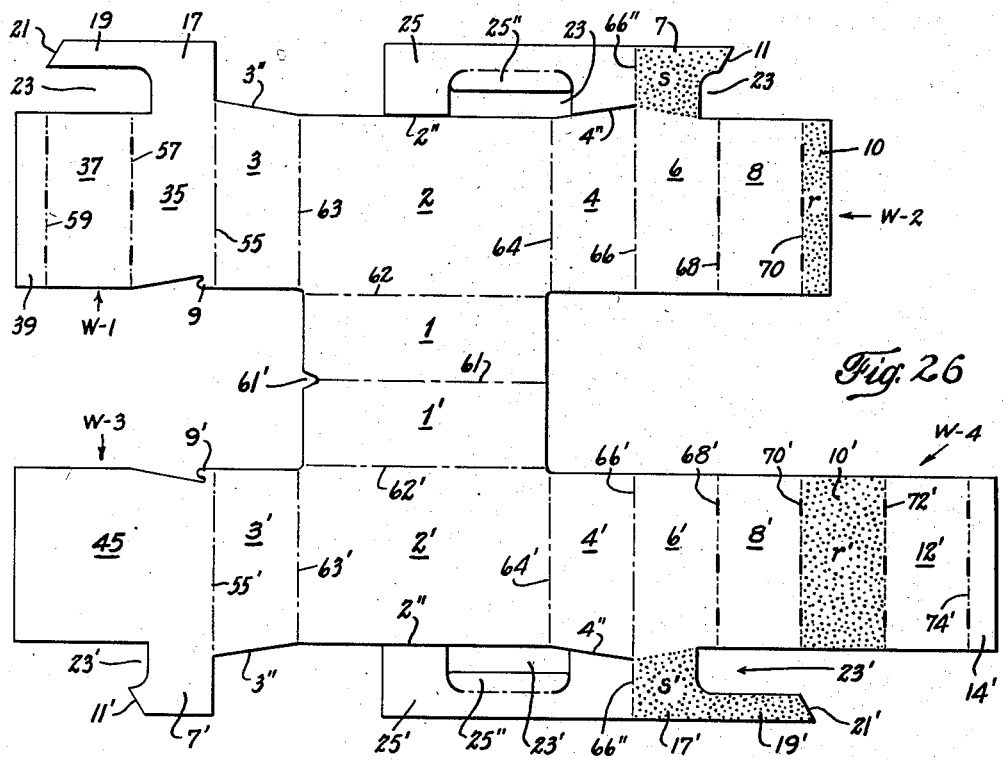
Figure 27:
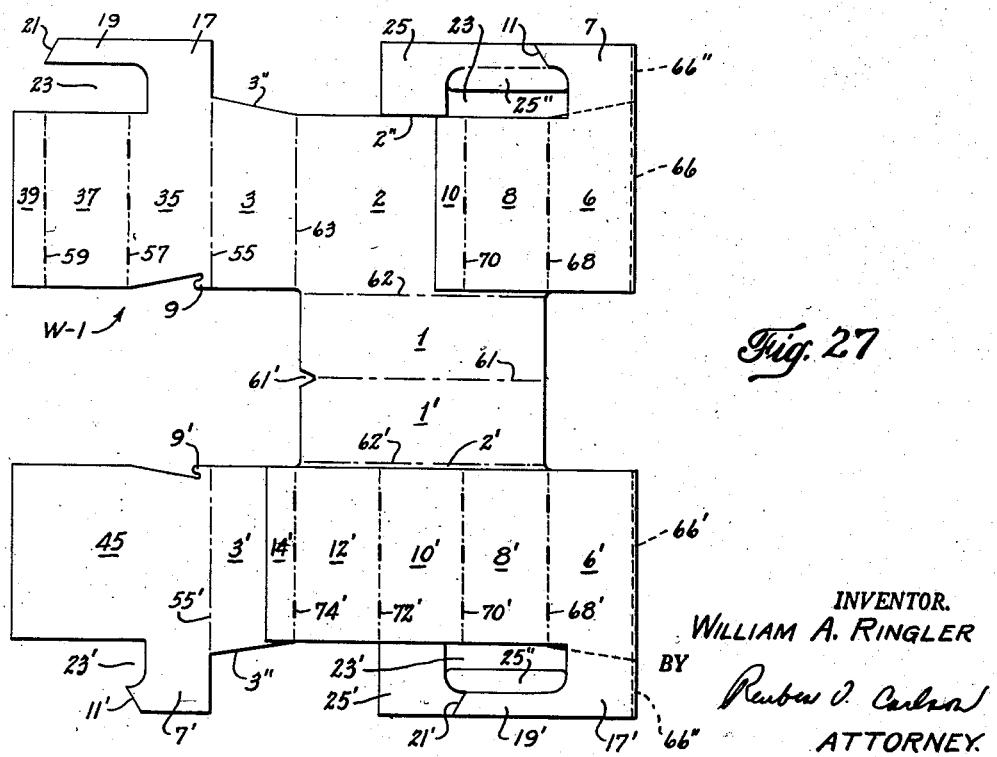

Fig. 26 is a plan view of another prepared blank which has been cut and scored in accordance with this invention to form a twin compartment carrier having three cells in each compartment; the center partition and cross partitions for both compartments being obtained entirely from the top and bottom wings at the right and left hand sides of the blank, areas of adhesive being shown applied to certain parts of the blank preparatory to execution of the first folding operation;

Fig. 27 is a plan view of the blank shown in Fig. 26 as it would appear after one pair of top and bottom wings has been overfolded upon the adjacent side panels of the blank;

Fig. 28 is a plan view of the blank shown in Fig. 27 as it would appear after the second folding operation has been executed thereon, this view showing adhesive areas applied to certain parts of the blank preparatory to execution of the next folding operation;

Fig. 29 is a plan view of the blank shown in Fig. 28 after the other pair of top and bottom wings has been folded into final position, this view showing adhesive areas applied to further parts of the blank preparatory to execution of the final folding operation;

Fig. 30 is a plan view of this fully assembled six cell carrier in collapsed form as produced after execution of the final folding operation upon the partly assembled blank shown in Fig. 29;

Fig. 31 is a perspective view of the erected carrier formed from the blank shown in Fig. 26; and Fig. 32 is a horizontal cross section of the erected carrier as it would appear when viewed along line 32—32 of Fig. 31, this view also showing in phantom lines a horizontal cross section of the carrier as it would appear when undergoing erection expansion.

Similar reference characters refer to similar parts throughout the several views of the drawings and the specification.

In the manufacture of the carrier forming blanks as illustrated in Figs. 1, 15 and 26, paperboard or fiberboard stock sheets are printed and decorated on one side thereof only and the carrier forming blanks may then be cut and scored therefrom in a single pass through a cutting and scoring machine adjusted to perform the requisite cutting and scoring operations. These carrier forming blanks are shaped and designed to yield little waste in cutting, and to permit high speed gluing and folding of the carrier blanks in a single pass through an automatic gluing and folding machine of substantially standard construction.

Figure 11:
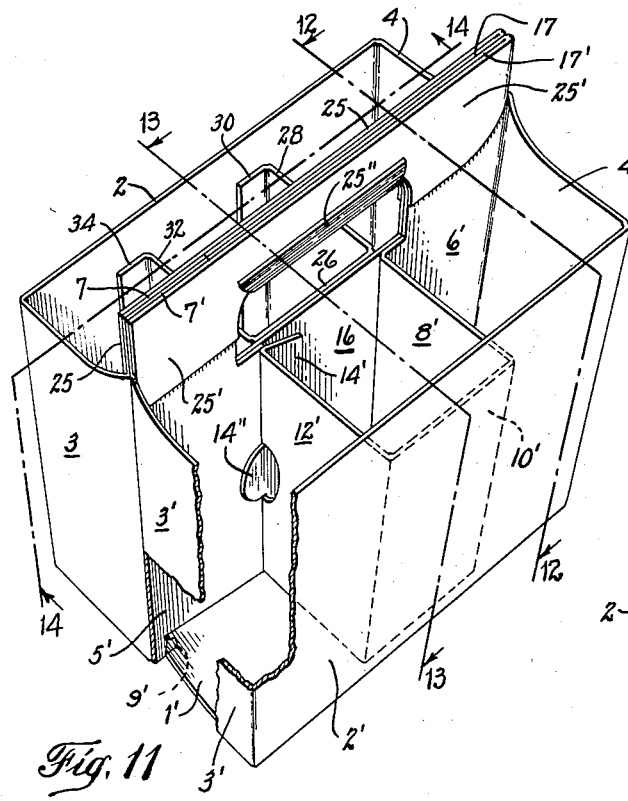
Fig. 11 is a perspective view of the fully erected carrier formed from the blank shown in Fig. 1, this view showing certain parts broken away to illustrate structural details thereof.
Figure 12:
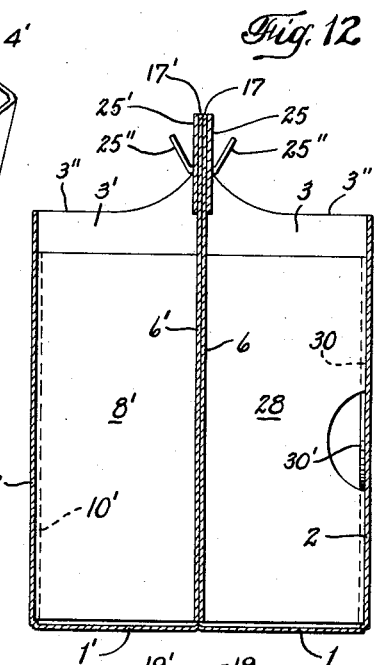
Fig. 12 is a vertical cross section taken transversely through the erected carrier as viewed along line 12—12 of Fig. 11.
Figure 13:
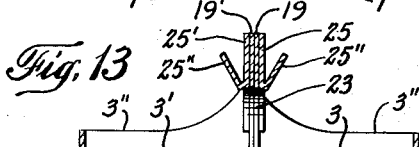
Fig. 13 is another vertical cross section taken transversely through the erected carrier as viewed along line 13—13 of Fig. 11.
Figure 14:
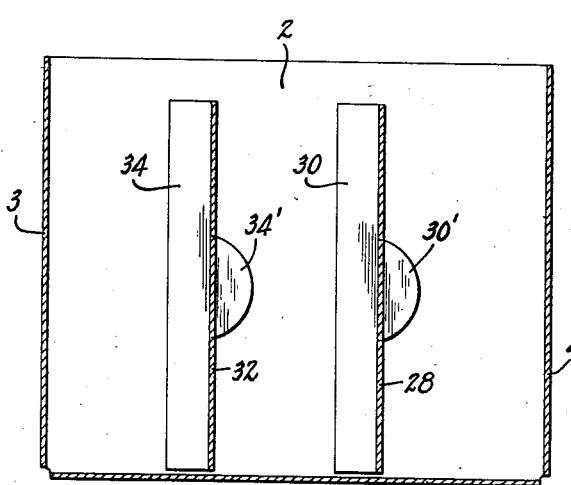
Fig. 14 is a vertical cross section taken longitudinally of the carrier as viewed along line 14—14 of Fig. 11.

The prepared blank as shown in Fig. 1 is designed to provide a twin compartment carrier having three bottle receiving cells in each compartment. The bottom panel comprises bottom half sections 1 and 1' hingedly connected along the longitudinally extending collapsing score 61. Side panels 2 and 2' are hingedly connected to the opposite side edges of bottom sections 1 and 1' along parallel extending scores 62 and 62' which are also parallel to the bottom collapsing score 61. Top and bottom end wings w–1 and w–3 are foldably connected by alinged scores 63 and 63' to the left hand side edges of the side panels 2 and 2', and top and bottom end wings w–2 and w–4 are foldably connected to the opposite side edges of the side panels 2 and 2' along aligned scores 64 and 64'. An intermediate wing w–5 is captured from material between the top and bottom wings w–2 and w–4 and is foldably connected along the transverse score 69 to the end wing w–2. When this blank is assembled into an erected carrier as shown in Fig. 11, one of the twin compartments is formed by the side panel 2' and the associated left and right hand wings w–3 and w–4, while the other twin compartment is formed by the side panel 2 and the associated left and right hand wings w–1 and and w–2 and the associated intermediate wing w–5.

The left hand wings w–1 and w–3 of the blank shown in Fig. 1 are scored to form a pair of end panel sections 3 and 3' foldably connected along the aligned scores 63 and 63' to the adjacent side edges of the side panels 2 and 2', and a pair of end cell center partition sections 5 and 5' are foldably connected along aligned scores 65 and 65' to the respective end panel sections 3 and 3'. The end cell center partition sections 5 and 5' extend above the top edges 3" of the adjacent end panel sections 3 and 3' to provide handle forming portions 7 and 7'. The lower ends of the end cell center partition sections 5 and 5' may be notched to provide hook portions 9 and 9' designed to engage into a conforming notch 61' formed in the adjacent end edge of the bottom panel to thereby maintain the assembled carrier in erect position as shown in Fig. 11.

The right hand wings of the blank shown in Fig. 1 are scored to form a second pair of end wall panel sections 4 and 4' foldably connected by aligned score lines 64 and 64' to the adjacent side edges of the side panels 2 and 2'. The lower wing w–4 has an end cell center partition section 6' which is foldably connected along a transverse score 66' to the adjacent end panel section 4'. A cross partition section 8' is foldably connected along a transverse score 68' to the adjacent end cell center partition section 6', a side wall liner section 10' is foldably connected along a transverse score 70' to the first cross partition section 8', a second cross partition section 12' is foldably connected along a transverse score 72' to the side wall liner section 10', and a center partition securing flap 14' is foldably connected to the second cross partition section 12' along a transverse score 74'. The transverse scores 64', 66', 68', 70', 72' and 74' extend substantially in parallelism and are substantially equally spaced transversely of the blank so that the sections 4', 6', 8', 10' and 12' are substantially of the same width. As thus constructed the wing w–4 provides, in addition to the end panel section 4', the two cross partition sections 8' and 12' for one of the twin compartments of the assembled carrier as shown in Fig. 11.

The right hand wing w–2 at the upper end of the blank has a center partition panel 16 foldably connected along a transverse score 66 to the adjacent end panel section 4 in alignment with the transverse score 66' which defines the end panel section 4' associated with the bottom wing w–4. The center partition panel 16 preferably has a transverse width which is somewhat more than two thirds of the length of the erected carrier so that when the center partition panel 16 is secured to the end cell center partition section 5 associated with the left hand wing w–1, a composite center partition section is provided which extends the full length of the assembled carrier.

The center partition panel 16 and the end cell center partition section 6' therebelow present similar upper extensions which extend above the top edge 4" of the adjacent end panel sections 4 and 4' and provide handle forming portions 17 and 17'. Handle forming leg portions 19 and 19' project laterally from the handle forming extensions 17 and 17' and define hand hole cutouts 23 and 23'. The free ends 21 and 21' of the handle forming leg portions 19 and 19' are miter cut to match the miter cut end portions 11 and 11' of the handle forming extensions 7 and 7' associated with the left hand wings w–1 and w–3 of the blank.

The cross partitions for the twin compartment formed by the side panel 2 and its associated left and right hand wings w–1 and w–2 are provided by the intermediate wing w–5 of the blank as shown in Fig. 1. The intermediate wing w–5, captured from stock sheet material between the right hand wings w–2 and w–4, comprises a center partition liner section 26 which is foldably connected along the transverse score 69 to the bottom end of the center partition panel 16. A first cross partition section 28 is foldably connected along a transverse score 68 to the adjacent side edge of the center partition liner section 26, and a side wall liner flap 30 is foldably connected along a transverse score 67 to the adjacent side edge of the first cross partition section 28. A second cross partition section 32 is foldably connected to the opposite side edge of the center partition liner section 26 along a transverse score 70, and a second side wall liner flap 34 is in turn foldably connected by a transverse score 72 to the second cross partition section 32. The transverse scores 67, 68, 70 and 72 extend substantially in parallelism and are substantially equally spaced transversely of the blank so that the first and second cross partition sections 28 and 32 and the intermediate center partition liner section 26 are approximately the same width and corresponding in width to the adjacent cell forming sections 6', 8' and 10' forming a part of the lower wing w–4.

As thus scored, the transverse score 67 is substantially in alignment with the aligned transverse scores 66 and 66', the transverse score 68 is substantially in alignment with the transverse score 68', the transverse score 70 is substantially in alignment with the transverse score 70' and the transverse score 72 is substantially in alignment with the transverse score 72'. The bottom end of the first cross partition section 28 and its associated side wall liner flap 30 is separated from the bottom end of the center partition panel 16 and the end panel section 4 by a transverse cut 69' in alignment with the transverse score 69. The bottom end of the second cross partition section 32 is likewise separated from the bottom end of the center partition panel 16 by a transverse cut 69" in alignment with the transverse score 69. The upper ends of the cross partition sections 28 and 32, their associated side wall liner flaps 30 and 34, and the intermediate center partition liner section 26, are all separated from the lower wing w–4 by a transverse cut 71 as shown in Fig. 1.

To reinforce and thicken the handle part, a pair of handle facing flaps 25 and 25' may be provided which are foldably connected to the adjacent side edges of the adjacent center partition panel 16 and the adjacent end cell center partition section 6' along transverse scores 66" which form aligned continuations of the transverse scores 66 and 66'. The handle forming flaps 25 and 25' are separated from the side panels 2 and 2' by transverse cuts 2" which define the upper edges of the side panels, the transverse cuts 2" joining the transverse cuts 4" which define the upper edges of the end panel sections 4 and 4'.

The handle reinforcing flaps 25 and 25' may thus be captured from material otherwise removed and discarded as waste, and may have a length equal to the longitudinal length of the erected carrier. The handle reinforcing flaps 25 and 25' may have hand hole cutouts 23 and 23' therein which will fall into registry with each other and with the hand hole cutouts 23 and 23' associated with the handle forming extensions 7 and 7' and 17 and 17' when the carrier is assembled, thereby providing a strong hand hole grip for the handle part as shown in Fig. 11.

If desired, the bracing strength of the side wall liner flaps 30 and 34 may be augmented by adding laterally extending foot tabs 30' and 34' thereto which are formed by providing arcuate cuts 67' and 72" which extend into the adjacent cross partition sections 28 and 32 and intersect the transverse scores 67 and 72. Similarly, the bracing strength of the center partition liner flap 14' forming a part of the wing w–4 may be augmented by the addition thereto of a foot tab 14" defined by an arcuate cut 74" extending into the adjacent cross partition section 12' and intersecting the transverse score 74'.

In assembling the carrier from the blank shown in Fig. 1, a patch a of adhesive is applied to the inside face of the center partition panel 16 as shown in Fig. 1, and the intermediate wing w–5 is then folded along the transverse score 69 so as to place the center partition liner section 26 in overlying glued relation to the center partition panel 16 as shown in Fig. 2. The first cross partition section 28 is then folded along the aligned score 68 as shown in Fig. 3, so as to place the cross partition section 28 and its associated side wall liner flap 30 in overlying relation to the overfolded center partition liner scection 26 and the second cross partition section 32.

A patch of adhesive b is then applied to the overfolded side wall liner flap 30 and a similar patch of adhesive c is applied to the side wall liner flap 34. A patch d of adhesive is also applied to the side wall liner section 10' associated with the wing w–4, and patches of adhesive e and e' are applied to the handle forming extensions 17 and 17' and the associated leg portions 19 and 19' as shown in Fig. 3. Upon completion of this patch gluing operation, the right hand wings w–2 and w–4 are folded along the aligned scores 66 and 66' so as to place the upper wing w–3 and the intermediate wing w–5 folded thereover as shown in Fig. 3 in overlying relation to the end panel section 4 and the adjacent side panel 2 as shown in Figs. 4 and 5. As thus folded, the spaced side wall liner flaps 30 and 34 become adhesively secured in spaced relation to the inside face of the side panel 2 as shown in Fig. 5. In this same folding operation, the handle forming extension 17 and its associated leg portion 19 become folded over and adhesively secured to the inside face of the adjacent handle facing flap 25. The simultaneous folding of the lower wing w–4 along the transverse score 66' places the end cell center partition section 6' in overlying but unglued relation to the adjacent end panel section 4', and places the associated cross partition sections 8' and 12' in overlying but unglued relation to the adjacent side panel 2', and places the intermediate side wall liner section 10' in overlying glued relation to the inside face of the side panel 2' as shown in Fig. 4, and with the handle extension 17' folded over and adhesively secured to the handle facing flap 25'.

In the same or in a subsequent folding operation, the second cross partition section 12' associated with the bottom wing w–4 is folded along the transverse score 72' so as to place the cross partition section 12' in unglued but overlying relation to the adjacent side wall liner section 10', which in turn places the center partition liner flap 14' in overlying relation to the first cross partition section 8' as shown in Fig. 6.

In preparation for the next folding operation, a strip f of adhesive is applied to the free edge of the center partition panel 16, a spot f' of adhesive is applied to the foot tab 14" associated with the center partition liner flap 14', and patches g and g' of adhesive are applied to the uncovered end portions of the handle facing flaps 25 and 25' as shown in Fig. 6. Thereupon the left hand wings w-1 and w-3 are folded along the aligned scores 63 and 63' so as to place the end panel sections 3 and 3' in overlying but unglued relation to the adjacent side panels 2 and 2', and to place the handle forming extensions 7 and 7' of the end cell center partition sections 5 and 5' in adhesively secured relation to the adjacent end portions of the handle facing flaps 25 and 25' as shown in Fig. 7. As thus folded, the mitered edges 11 and 11' of the handle forming extensions 7 and 7' will substantially abut the adjacent mitered edges 21 and 21' of the leg portions 19 and 19' forming a part of the handle extensions 17 and 17'. In this same folding operation, the free edge of the end cell center partition section 5 will become adhesively secured to the free edge of the adjacent center partition panel 16. When thus folded, the blank will appear as shown in Fig. 7.

Areas h of adhesive are then applied to the right hand portion of the center partition panel 16 to be covered by the end cell center partition section 6', to the end cell center partition section 5 and an adjacent portion of the center partition panel 16 to be covered by the end cell center partition section 5', and to the handle forming extensions 7 and 17 to be covered by the handle forming extensions 7' and 17', care being taken to apply no adhesive to that area of the center partition panel 16 to be covered by the cross partition section 8'. When the adhesive areas h have been applied to the blank as shown in Fig. 7 and above described, the blank is folded about the bottom collapsing score 61 to thereby adhesively secure the end cell center partition sections 5 and 5' and their associated handle forming extensions 7 and 7' firmly together, to secure the center partition liner flap 14' to the center partition panel 16, to secure the right hand portion of the center partition panel 16 to the end cell center partition section 6', and to secure the handle forming extensions 17 and 17' and their associated leg portions 19 and 19' firmly together. As thus folded and secured, the blank shown in Fig. 7 will be transformed into the fully assembled carrier as shown in Fig. 8.

The collapsed carrier as shown in Fig. 8 may be fully erected into the form shown in Fig. 11 by grasping the handle part and pressing the bottom collapsing score 61 against a flat surface so as to cause expansion of the twin compartments of the carrier. The carrier can thereupon be maintained in erected position by interlocking the hook portions 9 and 9' in the notch 61' at the adjacent end edge of the bottom panel as shown in Fig. 11.

As thus formed and erected, the cross partition sections 8' and 12' will be foldably connected to the side wall liner section 10' which additionally reinforces and strengthens the erected side panel 2', the other end of the cross partition section 8' will be foldably connected to the adjacent end cell center partition sections 6', and the other cross partition section 12' will be firmly secured by the center partition liner flap 14' to the center partition structure of the carrier. Where a foot tab 14" is provided, the foot tab will also be secured to the center partition structure of the carrier shown in Fig. 11 to further brace and strengthen the cross partition section 12'.

The cross partitions 28 and 32 in the companion compartment of the carrier, as formed from the intermediate wing w-5 of the blank, will be firmly secured to the inside face of the adjacent side panel 2 by the side wall liner flaps 30 and 34, which may be further stiffened and strengthened by associated foot tabs 30' and 34' also secured to the inside face of the side panel 2. The other end of the cross partition sections 28 and 32 will be integrally and foldably secured to the center partition liner section 26 which forms a part of the center partition structure of the carrier.

The adjacent end panel sections 3 and 3' will also be integrally and foldably connected to the side panels 2 and 2' along the corner forming scores 63 and 63' and will be connected to the inturned end cell center partition forming sections 5 and 5' forming a part of the center partition structure of the carrier along the adjacent collapsing folds 65 and 65'. The end panel sections 4 and 4' at the other end of the carrier will also be integrally and foldably connected to the side panels 2 and 2' by the corner forming folds 64 and 64' and to the inturned center partition panel 16 and the adjacent end cell center partition section 6' along the adjacent collapsing folds 66 and 66'.

It will be noted that the lower part of the center partition structure as shown in Fig. 10 is formed of not less than two plies of material throughout, so that one pair of end cells is separated by the adjacent end cell center partition sections 5 and 5', and the other pair of end cells is separated by the adjacent center partition panel 16 and the adjacent end cell center partition section 6', with the intermediate cells separated by the center partition panel 16 and the center partion liner section 26.

The handle forming part of the center partition structure is of four ply thickness throughout and is formed by the overlapped handle forming extensions 7 and 7' and the overlapped handle forming extensions 17 and 17' and their associated leg portions 19 and 19', all sandwiched between and adhesively secured to the handle facing flaps 25 and 25' as shown in Figs. 9, 11, 12 and 13. As thus assembled, the four ply handle part presents a convenient hand hole therein as formed by the aligned hand hole cutouts 23 and 23'. Upturned edging flaps 25", captured from the hand hole openings in the handle facing flaps 25 and 25', may also be provided to further strengthen the hand grip of the handle part.

The prepared blank as shown in Fig. 15 is designed to provide a twin compartment carrier having four bottle receiving cells in each compartment. The bottom panel is sized to support eight bottles and comprises bottom half sections 1 and 1' hingedly connected along the longitudinally extending collapsing score 61. Side panels 2 and 2' are hingedly connected to the opposite side edges of the bottom sections 1 and 1' along parallel extending scores 62 and 62' which are also parallel to the bottom collapsing score 61. Top and bottom wings w-1 and w-3 are foldably connected by aligned scores 63 and 63' to the left hand side edges of the side panels 2 and 2', and top and bottom end wings w-2 and w-4 are foldably connected to the opposite side edges of the side panels 2 and 2' along aligned scores 64 and 64'. An intermediate wing w-5 is captured from material between the top and bottom wings w-2 and w-4 and is foldably connected along the transverse score 69 to the end wing w-2. When this blank is assembled into an erected carrier as shown in Fig. 25, one of the twin compartments is formed by the side panel 2' and the associated left and right hand wings w-3 and w-4, while the other twin compartment is formed by the side panel 2 and the associated left and right hand wings w-1 and w-2 in association with the intermediate wing w-5.

The left hand wings w-1 and w-2 of the blank shown in Fig. 15 are scored to form a pair of end panel sections 3 and 3' foldably connected along the aligned scores 63 and 63' to the adjacent side edges of the side panels 2 and 2', and a pair of center partition securing flaps 15 and 15' are foldably connected along aligned scores 65 and 65' to the respective end panel sections 3 and 3'. The center partition securing flaps 15 and 15' extend above the top edges 3" of the adjacent end panel sections 3 and 3' to provide securing flap extensions 15". The lower ends of the center partition securing flaps 15 and 15' may be notched to provide hook portions 9 and 9' designed to engage into a conforming notch 61' formed in the adjacent end edge of the bottom panel to thereby maintain the assembled carrier in erect position as shown in Fig. 25.

The right hand wings of the blank shown in Fig. 15 are scored to form a second pair of end panel sections 4 and 4' foldably connected along the aligned score lines 64 and 64' to the adjacent side edges of the side panels 2 and 2'. The lower wing extension w–4 has an end cell center partition section 6' which is foldably connected along the transverse score 66' to the adjacent end panel section 4'. A cross partition section 8' is foldably connected along a transverse score 68' to the adjacent end cell center partition section 6', a side wall liner section 10' is foldably connected along a transverse score 70' to the first cross partition section 8', and a second cross partition section 12' is foldably connected along a transverse score 72' to the side wall liner section 10'. Additionally, a center partition liner section 20' is foldably connected along a transverse score 74' to the second cross partition section 12', a third cross partition section 22' is foldably connected by a transverse score 76' to the adjacent center partition liner section 20', and a side wall securing flap 24' is foldably connected to the third cross partition section 22' along a transverse score 78'. The transverse scores 64', 66', 68', 70', 72', 74', 76' and 78' extend substantially in parallelism and are substantially equally spaced transversely of the blank so that the sections 4', 6', 8', 10', 12', 20' and 22' are substantially of the same width. As thus constructed, the wing w–4 provides, in addition to the end panel section 4', the three cross partition sections 8', 12' and 22' for one of the twin compartments of the assembled carrier as shown in Fig. 25.

The right hand wing w–2 at the upper end of the blank has a center partition panel 46 foldably connected along a transverse score 66 to the adjacent end panel section 4, the transverse score 66 being substantially in alignment with the transverse score 66' which defines the end panel section 4' associated with the bottom wing w–4. The center partition panel 46 has a transverse width which is substantially equal to the length of the erected carrier so that the center partition securing flaps 15 and 15' will overlap the free end edge of the panel 46 when the carrier is assembled. The center partition panel 46 and the end cell center partition section 6' therebelow present upper extensions 47 and 47' which extend above the top edge 4" of the adjacent end panel sections 4 and 4' and provide handle forming portions which extend the full length of the assembled carrier and are provided with hand hole cutouts 48 and 48'.

The cross partitions for the twin compartment formed by the side panel 2 and its associated left and right hand wings w–1 and w–2 are provided by the intermediate wing w–5 of the blank as shown in Fig. 15. The intermediate wing w–5 comprises a center partition liner section 26 which is foldably connected along a transverse score 69 to the bottom end of the center partition panel 46. A first cross partition section 28 is foldably connected along a transverse score 68 to the adjacent side edge of the center partition liner section 26, and a side wall liner flap 30 is foldably connected along a transverse score 67 to the adjacent side edge of the first cross partition section 28. A second cross partition section 32 is foldably connected to the opposite side edge of the center partition liner section 26 along a transverse score 70, a side wall liner section 36 is in turn foldably connected by a transverse score 72 to the second cross partition section 32, a third cross partition section 38 is foldably connected by a transverse score 74 to the side wall liner section 36, and finally, a center partition liner flap 40 is foldably connected by a transverse score 76 to the adjacent cross partition section 38. The transverse scores 67, 68, 70, 72, 74 and 76 extend substantially in parallelism and are substantially equally spaced transversely of the blank so that the first, second and third cross partition sections 28, 32 and 38 and the intervening liner sections 26 and 36 are approximately the same width and corresponding in width to the adjacent cell forming sections 6', 8', 10', 12' and 20' forming a part of the lower wing w–4.

As thus scored, the transverse score 67 is substantially in alignment with the aligned transverse scores 66 and 66', and the transverse scores 68, 70, 72, 74 and 76 of wing w–5 are substantially in alignment with the transverse scores 68', 70', 72', 74' and 76' of wing w–4 as shown in Fig. 15. The bottom end of the first cross partition section 28 and its associated side wall liner flap 30 is separated from the bottom end of the center partition panel 46 and the end panel section 4 by transverse cut 69' in alignment with the transverse score 69. The bottom ends of the second cross partition section 32 and the adjacent side wall liner section 36 are likewise separated from the bottom end of the center partition panel 46 by cut 69" in alignment with the transverse score 69. The upper ends of the cross partition sections 28, 32 and 38 and their associated liner sections 26 and 36 and liner flaps 30 and 40, are all separated from the lower wing w–4 by a transverse cut 71 as shown in Fig. 15.

To reinforce and thicken the handle part, a pair of handle liner flaps 25 and 25' may be provided which are foldably connected to the adjacent side edges of the respective center partition panel 46 and the end cell center partition section 6' along transverse scores 66" which form aligned continuations of the transverse scores 66 and 66'. The handle forming flaps 25 and 25' are separated from the side panels 2 and 2' by transverse cuts 2" which define the upper edges of the side panels, the transverse cuts 2" joining the transversely inclined cuts 4" which define the upper edges of the end panel sections 4 and 4'. The handle reinforcing flaps 25 and 25' may thus be captured from material otherwise removed and discarded as waste, and may have a length equal to the longitudinal length of the erected carrier. The handle reinforcing flaps 25 and 25' may have hand hole cutouts 23 and 23' therein which will fall into registry with each other and with the hand hole cutouts 48 and 48' associated with the handle forming extensions 47 and 47' when the carrier is assembled, thereby providing a suitable hand hole grip for the handle part thereof as shown in Fig. 25. Hand grip edging flaps 25" may be captured from material normally removed when forming the hand hole cutouts 23 and 23' in the handle facing flaps 25 and 25' as shown in Figs. 15 and 25.

In assembling the carrier from the blank shown in Fig. 1, the initial gluing and folding operations are applied to the intermediate wing w–5. As the first step, the third cross partition section 38 of the intermediate wing is folded along the transverse score 74 so as to place the cross partition section 38 in overlying relation to the adjacent side wall liner section 36, with the center partition liner flap 40 overlying the second cross partition section 32 as shown in Fig. 16. An adhesive patch i is then applied to the center partition liner section 26 and an adhesive strip j is applied to the overfolded center partition liner flap 40 as shown in Fig. 16. Thereupon the intermediate wing w–5 is folded along the transverse score as shown in Fig. 17 so as to place the center partition liner section 26 and the center partition liner flap 40 in spaced adhesively secured relation to the adjacent face of the center partition panel 46 as shown in Fig. 17.

In substantially the same or in a subsequent folding operation, the first cross partition section 28 of the overfolded intermediate wing w–5 is folded along the transverse score 68 as shown in Fig. 18 so as to place the first cross partition section 28 in overlying relation to the adjacent center partition liner section 26, with the associated side wall liner flap 30 extending over the underlying second cross partition 32. An adhesive strip $k$ is then applied to the overfolded side wall liner flap 30, a patch $l$ of adhesive is applied to the side wall liner section 10' of the adjacent bottom wing w–4, and a strip $m$ of adhesive applied to the side wall securing flap 24'. Additionally, adhesive patches $n$ and $n'$ are applied over the entire area of the handle liner flaps 25 and 25' as shown in Fig. 18.

When thus glued, the right hand wings w–2 and w–4 are folded along the aligned scores 66 and 66' as shown in Fig. 19 which will effect adhesive securement of the side wall liner flap 30 of the intermediate wing w–5 to the inside face of the adjacent side panel 2, with the center partition panel 46 overlying the end panel section 4 and the simultaneously folded intermediate wing w–5. The upper handle extension 47 of the center partition panel 46 will also become adhesively secured to the adjacent underlying handle liner flap 25. This folding operation will also place the handle forming extension 47' associated with the bottom wing w–4 in adhesively secured relation to the adjacent handle liner flap 25' as shown in Fig. 19, will place the end cell center partition section 6' in unglued and overlying relation to the adjacent end panel section 4', and will effect adhesive securement of the previously glued side wall liner section 10' to the inside face of the adjacent side panel 2'.

In a reverse fold operation, which may be performed simultaneously with the folding of the wing w–4 along the aligned score 66', the second cross partition section 12' is folded along the transverse score 72' so as to overlie the adjacent side wall liner section 10' as adhesively secured to the inside face of the side panel 2' as indicated in Fig. 20. In the same operation, the center partition liner section 20' will be reverse folded along the transverse score 74' so as to overlie the folded second cross partition section 12'. This reverse folding operation will place the glued side wall liner flap 24' in proper position for adhesive securement to the inside face of the side panel 2'. When this folding operation has been completed on the wing w–4, the blank will appear as shown in Fig. 21.

In the next gluing operation, an adhesive strip $o$ is applied to the center partition securing flap 15 and a patch $o'$ of adhesive is applied to the upper extension 15" of the center partition securing flap 15'. The end panel sections 3 and 3' are then folded along aligned scores 63 and 63' so that the center partition securing flap 15 and its upper extension 15" becomes adhesively secured to the free edge of the center partition panel 16 and its handle forming extension 47 as indicated in Fig. 22. This same folding operation will place the upper extension 15" of the center partition securing flap 15' into adhesive securement with the free end of the adjacent handle forming extension 47' shown in Fig. 22. It will be noted that in this operation the unglued portion of the center partition securing flap 15' will not be secured to the third cross partition section 22' which it overlies.

Areas $p$ of adhesive are then applied to the end cell center partition section 6' and to its handle forming extension 47', to the entire length of the folded center partition securing flap 15' and its extension 15", and to the entire surface of the center partition liner section 20' as shown in Fig. 22. In this gluing operation care must be taken to apply no adhesive to the exposed faces of the first cross partition section 8' or the third cross partition section 22'.

In the final folding operation the blank shown in Fig. 22 is folded on its bottom collapsing score 61 so as to place the end cell center partition section 6' in secured relation to the right hand portion of the center partition panel 46, to place the glued center partition liner section 20' in secured relation to a medial portion of the center partition panel 46, and to place the center partition securing flap 15' and its extension 15" in secured relation to the center partition securing flap 15' and its extension 15". In the same folding operation the handle forming extension 47' associated with the end cell center partition section 6' becomes adhesively secured to the handle extension 47 of the center partition panel 46, with all hand holes 23 and 23' in true alignment. This folding operation completes the assembly of this eight cell carrier in collapsed form as shown in Fig. 23.

The collapsed carrier as shown in Fig. 23 may be fully erected in the form shown in Fig. 25 by grasping the handle part and pressing the bottom collapsing score 61 against a flat surface so as to cause expansion of the twin compartments of the carrier. The carrier may thereupon be maintained in erected position by interlocking the hook portions 9 and 9' with the notch 61' at the adjacent end of the bottom panel.

As thus assembled, one of the twin compartments will have its first and second cross partition sections 8' and 12' foldably connected to the side wall liner section 10' which is glued to the adjacent side panel 2' and which thereby reinforces the side panel 2'. The third cross partition section 22' will also be foldably connected to the side panel 2' by its associated side wall liner flap 24' as shown in Figs. 24 and 25. Additionally, the third cross partition section 22' will be foldably connected to the second cross partition section 12' by the center partition liner section 20' which forms a part of the center partition structure of this eight cell carrier.

The other twin compartment of the carrier will also present three cross partition sections as shown in Figs. 24 and 25, and wherein the first cross partition section 28 will be foldably secured to the adjacent side panel 2 by its associated side wall liner flap 30, with the second and third cross partition sections 32 and 38 foldably secured to the inside face of the adjacent side panel 2 by their connecting side wall liner section 36 which also braces and strengthens the side panel 2. The first and second cross partition sections 28 and 32 are foldably connected to the center partition liner section 26 which forms a part of the center partition structure of the carrier, and the third cross partition section 38 will be secured by its associated center partition liner flap 40 to the center partition structure of the carrier.

The adjacent end panel sections 3 and 3' are integrally and foldably connected to the side panels 2 and 2' along the corner forming scores 63 and 63' and are integrally and foldably connected along the adjacent scores 65 and 65' to the inturned center partition securing flaps 15 and 15' which form a part of the center partition structure. If desired, the center partition securing flaps 15 and 15' may extend substantially the full length of the adjacent end cell so that their vertical edges substantially abut the adjacent third cross partition section 22'. The end panel sections 4 and 4' at the other end of the carrier are foldably connected to the side panels 2 and 2' by the corner forming scores 64 and 64' and are also foldably connected along the adjacent scores 66 and 66' to the adjacent end edge of the center partition panel 46 and the end cell center partition sections 6' respectively.

As thus formed, the lower part of the center partition structure as shown in Fig. 24 comprises substantially two plies of sheet material throughout its length, with the paired end cells adjacent the end panel sections 4 and 4' centrally separated by the center partition panel 46 and the adjacent end cell center partition section 6', with the paired end cells adjacent the end panel sections 3 and 3' separated by the center partition panel 46 as overlapped by the center partition securing flaps 15 and 15'. Also, one pair of adjacent intermediate cells are separated by the center partition panel 46 and the adjacent center partition liner section 20', and the other pair of intermediate cells are separated by the center partition panel 46 and the adjacent end cell center partition section 26 as shown in Fig. 24. A strong and sturdy backbone structure for this carrier is thus provided.

The handle part of this eight cell carrier is formed from four plies of material as shown in Fig. 25, comprising the outer handle liner flaps 25 and 25' between which the full length handle forming extensions 47 and 47' are sandwiched. One end of the handle part has added thereto the inwardly projecting extensions 15" of the center partition securing flaps 15 and 15' and thus has a thickness of six plies. A strong and sturdy handle part for this eight cell carrier is thus provided with an appropriate hand hole therein which may be reinforced and made more comfortable for the hand by the upturned hand grip edging flaps 25".

The prepared blank as shown in Fig. 26 is designed to form a twin compartment carrier having three bottle receiving cells in each compartment, and wherein the center partition structure and the cross partition sections are all acquired from a pair of top and bottom wings w–1 and w–3 extending from the left hand side of the blank and a pair of top and bottom wings w–2 and w–4 extending from the right hand side of the blank. The bottom wall is sized to support six bottles and comprises bottom half sections 1 and 1' foldably connected along a longitudinally collapsing score 61. Side panels 2 and 2' are foldably connected to the opposite side edges of bottom sections 1 and 1' along parallel extending scores 62 and 62' which are also parallel to the bottom collapsing score 61. The top and bottom wings w–1 and w–3 at the left hand side of the blank are foldably connected by aligned scores 63 and 63' to the adjacent end edges of the side panels 2 and 2', and the top and bottom wings w–2 and w–4 are foldably connected to the opposite side edges of the side panels 2 and 2' along the aligned scores 64 and 64'. When this blank is assembled into an erected carrier as shown in Fig. 31, one of the twin compartments is formed by the side panel 2' and the associated left and right hand wings w–3 and w–4, while the other twin compartment is formed by the side panel 2 and the associated left and right hand wings w–1 and w–2.

The left hand wings w–1 and w–3 of the blank shown in Fig. 26 are scored to form a pair of end panel sections 3 and 3' foldably connected along the aligned scores 63 and 63' to the adjacent end edges of the side panels 2 and 2'. An end cell center partition section 35 is foldably connected to the adjacent edge of the end panel section 3 by a transverse score 55, a cross partition section 37 is foldably connected to the adjacent edge of the end cell center partition section 35 along a transverse score 57, and a side wall liner flap 39 is foldably connected by transverse score 59 to the adjacent cross partition section 37. The end panel section 3' associated with the bottom wing w–3 has a center partition panel 45 foldably connected thereto by a transverse score 55' substantially in alignment with the transverse score 55 in the adjacent upper wing w–1. The center partition panel 45 has a width transversely of the blank which measures at least two thirds of the length of the carrier as assembled so that when the center partition panel 45 is subsequently adhesively joined to a center partition section 6' associated with the opposite wing w–4, a center partition will be provided which extends the full length of the assembled carrier. The lower ends of the center partition section 35 and the center partition panel 45 may be notched to provide hook portions 9 and 9' designed to engage into a conforming notch 61' formed in the adjacent end edge of the bottom panel to thereby maintain the carrier in erected position as shown in Fig. 31.

The right hand wings of the blank shown in Fig. 26 are scored to form a second pair of end panel sections 4 and 4' foldably connected along the aligned scores 64 and 64' to the adjacent end edge of the side panels 2 and 2'. The lower wing w–4 has an end cell center partition section 6' foldably connected along the transverse score 66' to the adjacent end panel section 4', a cross partition section 8' foldably connected along the transverse score 68' to the adjacent end cell center partition section 6', a side wall liner section 10' foldably connected along a transverse score 70' to the first cross partition section 8', a second cross partition section 12' foldably connected along a transverse score 72' to the side wall liner section 10', and a center partition securing flap 14' foldably connected to the second cross partition section 12' along a transverse score 74'. The transverse scores 64', 66', 68', 70', 72' and 74' extend substantially in parallelism and are substantially equally spaced transversely of the blank so that the sections 4', 6', 8', 10' and 12' are substantially of the same width. As thus constructed, the wing w–4 provides, in addition to the end panel section 4', the two cross partition sections 8' and 12' for one of the twin compartments of the assembled carrier as shown in Fig. 31.

The right hand wing w–2 at the upper end of the blank has an end cell center partition section 6 foldably connected along a transverse score 66 to the adjacent end panel section 4, a cross partition section 8 foldably connected along a transverse score 68 to the adjacent end cell center partition 6, and a side wall liner flap 10 foldably connected along a transverse score 70 to the cross partition section 8. The transverse scores 64, 66, 68 and 70 extend substantially in parallelism and substantially in alignment with the transverse scores 64', 66', 68' and 70' formed in the wing w–4 therebelow, thereby making the sections 4, 6, and 8 of substantially equal width and substantially equal in width to the corresponding sections 4', 6' and 8' forming a part of the wing w–4.

The end cell center partition sections 6 and 35 forming a part of one twin compartment present upper extensions 7 and 17 respectively which extend above the adjacent top edges 4" and 3" of the adjacent end panel sections 4 and 3. The handle forming extension 17 associated with the end cell center partition section 35 has a laterally projecting leg portion 19 defining a hand hole cutout 23. The leg portion 19 terminates in a mitered edge 21 designed to substantially abut the corresponding mitered edge 11 of the handle forming extension 7 associated with the end cell center partition section 6 when the blank is assembled into carrier form.

The center partition panel 45 forming a part of wing w–3 also has a handle forming extension 7' terminating in a mitered edge 11' and defining a hand hole cutout 23'. The end cell center partition section 6' associated with the wing w–4 has a companion handle forming extension 17' and presents a leg portion 19' projecting therefrom which terminates in a mitered edge 21' and defines a hand hole cutout 23'. When this blank is assembled into carrier form, the mitered ends 21' and 11' of the handle forming extensions 17' and 7' will be substantially in abutment.

To reinforce and thicken the handle part, a pair of handle facing flaps 25 and 25' may be provided which are foldably connected to the adjacent end edges of the respective end cell center partition sections 6 and 6' along transverse scores 66" which form aligned continuations of the transverse scores 66 and 66'. The handle forming flaps 25 and 25' are separated from the side panels 2 and 2' by transverse cuts 2" which define the upper edges of the side panels, the transverse cuts 2" joining the transversely inclined cuts 4" which define the upper edges of the end panel sections 4 and 4'. The handle reinforcing flaps 25 and 25' may thus be captured from material otherwise removed and discarded as waste, and may have a length equal to the longitudinal length of the erected carrier. The handle reinforcing flaps 25 and 25' may have hand hole cutouts 23 and 23' therein which will fall into registry with each other and with the hand hole cutouts 23 and 23' associated with the handle forming extensions 17 and 17', 7 and 7' when the carrier is assembled, thereby providing a convenient hand grip for the handle part as shown in Fig. 31. Hand grip edging flaps 25" and 25" may be captured from material normally removed when forming the hand hole cutouts 23 and 23' in the handle facing flaps 25 and 25' as shown in Figs. 26 and 31.

In assembling the carrier from the blank shown in Fig. 26, an adhesive strip $r$ is applied to the side wall liner flap 10 of the wing $w$–2, and a patch of adhesive $r'$ is applied to the side wall liner section 10' of wing $w$–2. Additionally, a patch of adhesive $s$ is applied to the handle forming extension 7 of the end cell center partition section 6 and a patch $s'$ of adhesive is applied to the handle forming extension 17' of the end cell center partition section 6' as shown in Fig. 26. The right hand wings $w$–2 and $w$–4 of the blank are folded along the aligned scores 66 and 66' as shown in Fig. 27 so that the end cell center partition section 6 will overlie the end panel section 4, with its handle forming extension 7 overlying and adhesively secured to the adjacent end portion of the handle facing flap 25. Additionally, the cross partition section 8 will then be overlying the adjacent side panel 2 and its associated side wall liner flap 10 will be placed in adhesive securement to the inside face of the side panel 2 as shown in Fig. 27.

As a result of this same folding operation, the wing $w$–4 will be folded along the transverse score 66' so as to place the end cell center partition section 6' in overlying relation to the adjacent end panel section 4', with the handle forming extension 17' thereof adhesively secured to the adjacent handle facing flap 25' as shown in Fig. 27. Additionally, the first cross partition section 8' will overlie but be unsecured to the adjacent side panels 2', the side wall liner section 10' will be adhesively secured to a medial portion of the side panel 2', and the second cross partition section 12' and its associated center partition liner flap 14' will overlie the remainder of the side panel 2' and partly overlie the opposite end panel section 3' as shown in Fig. 27.

In another folding operation the cross partition section 37 associated with the wing $w$–1 will be folded along the transverse score 57 so that it overlies the adjacent end cell center partition section 35, with its side wall liner flap 39 overlying the adjacent end panel section 3, as shown in Fig. 28. By a simultaneously executed folding operation the second cross partition section 12' of wing $w$–4 will be folded along the transverse score 72' so as to overlie but be unsecured to the adjacent side wall liner section 10', the associated center partition liner flap 14' then overlying but unsecured to the first cross partition section 8' as shown in Fig. 28.

In the next gluing operation, a strip of adhesive $t$ is applied to the overfolded side wall liner flap 39 associated with the wing $w$–1, a corresponding strip of adhesive $t'$ is applied to the reverse folded center partition liner flap 14' associated with the wing $w$–4, and a strip of adhesive $t''$ is applied to a portion of the overfolded end cell center partition section 6' adjacent the folding score 68', care being taken to apply no adhesive to the exposed face of the intervening cross partition section 8'. As shown in Fig. 28, a patch of adhesive $u$ is applied to the uncovered area of the handle facing flap 25 and a patch of adhesive $u'$ is applied to the uncovered area of the handle facing flap 25'. When thus glued as shown in Fig. 28, the left hand wings $w$–1 and $w$–3 are folded along the aligned scores 63 and 63' so as to place the cross partition section 37' in overlying relation to the adjacent side panel 2 with its side panel liner flap 39 adhesively secured to the adjacent inside face of the side panel 2. By this same folding operation, the end panel section 3' will overlie the adjacent side panel 2' and the free edge of the center partition panel 45 will become adhesively secured to the overfolded center partition liner flap 14' and to the end cell center partion section 6', thereby producing the blank assembly as shown in Fig. 29.

Patches $v$ of adhesive are then applied to the overfolded end cell center partition sections 6 and 35 and to the handle forming extensions 7 and 17 thereof as shown in Fig. 29, care being taken to apply no adhesive to the exposed face of the cross partition section 8. When thus glued, the blank is folded about the bottom collapsing score 61 so as to place the end cell center partition section 6' and the free edge of the center partition panel 45 in adhesively secured relation to the end cell center partition section 6, to place a portion of the end cell center partition panel 45 adjacent the transverse score 55' in adhesively secured relation to the end cell center partition section 35, and to place their associated handle forming extensions 17' and 7' in adhesively secured relation to the handle forming extensions 7 and 17 respectively associated with the end cell center partition sections 6 and 35. When thus assembled, the six cell carrier in collapsed form will be produced as shown in Fig. 30.

The collapsed carrier as shown in Fig. 30 may be erected into the form shown in Figs. 31 and 32 by grasping the handle part and pressing the bottom collapsing score 61 against a flat surface so as to cause expansion of the twin compartments of the carrier. The carrier can thereupon be maintained in erected position by interlocking the hook portions 9 and 9' with the notch 61' at the adjacent end edge of the bottom panel.

As thus formed and erected, the cross partition sections 8' and 12' in one carrier compartment will be foldably connected to the side wall liner section 10' which is adhesively secured to the inside face of the erected side panel 2'. The other end of the cross partition section 8' will be foldably connected to the adjacent end cell center partition section 6' which forms a part of the center partition structure of the carrier, and the other cross partition section 12' will be secured by center partition liner flap 14' to the center partition panel 45 as shown more particularly in Fig. 32.

The other twin compartment of the carrier will have its cross partition section 8 foldably connected to the adjacent end cell center partition section 6 forming a part of the center partition structure, and its opposite end will be secured by the side wall liner flap 10 to the inside face of the adjacent side panel 2. The other cross partition section 37 will be similarly foldably connected to the end cell center partition section 35 forming a part of the center partition structure, and the other end thereof will be foldably connected by its side wall liner flap 39 to the adjacent side panel 2. The side wall liner flaps 10 and 39 also provide bracing reinforcement to the side panel 2 to which they are adhesively secured.

The adjacent end panel sections 3 and 3' will be foldably connected to the side panels 2 and 2' along the corner forming scores 63 and 63' and to the inturned end cell center partition section 35 and the center partition panel 45 respectively, along the adjacent collapsing folds 55 and 55'. The opposite end panel sections 4 and 4' will be integrally and foldably connected to the side panels 2 and 2' by the corner forming folds 64 and 64', and to the inturned end cell center partition sections 6 and 6', respectively, by the adjacent scores 66 and 66'.

The center partition structure which defines the twin compartments is of double ply thickness substantially throughout its length. The paired end cells adjacent the end panels 4 and 4' are separated by double ply sheet material formed by the end cell center partition sections 6 and 6' between which the free end of the center partition panel 45 is sandwiched as shown in Figs. 31 and 32. The paired end cells adjacent the end panels 3 and 3' are also separated by two plies of sheet material as formed by the center partition panel 45 and the end cell center partition section 35 adhesively secured thereto. The intermediate cells of the carrier are separated by the center partition panel 45 whose end portion is securely locked between the end cell center partion sections 6 and 6'. The center partition liner flap 14' also provides in whole or in part the second ply which separates the intermediate cells. If desired the center partition liner flap 14' may be made of sufficient width so that its free end substantially abuts the cross partition section 8' to thereby provide a complete double ply separating partition for the intermediate cells.

The handle forming part of the center partition structure is of four ply thickness throughout. One of the inner plies thereof is formed by the matching handle forming extensions 7 and 17 and the other inner ply is formed by the handle forming extensions 17' and 7' whose abutting ends 21' and 11' are in staggered relation to the corresponding abutting ends 11 and 21 of the handle forming extensions 7 and 17. The outer plies of the handle part are formed by the handle facing flaps 25 and 25', with all of the four plies of the handle part adhesively secured together throughout the length thereof. As the handle part is assembled as shown in Fig. 31, the hand hole cutouts 23 and 23' are in true registry and a strong hand grip thereabove is provided which may be faced by the upturned edging flaps 25" as shown in Fig. 31 to make the hand grip comfortable to the hand.

Bottle carriers made in accordance with this invention incorporate a multi-ply center partition which provides a strong and sturdy backbone structure whose handle part may be made four or more plies in thickness. The cell defining cross partitions extend down to the bottom wall of the carrier as erected and up to the approximate height of the side panels, thereby providing full cushioned protection to the bottles contained in the carrier cells. The side panels are reinforced and stiffened by side wall liner sections and flaps, integrally hinged to the cross partition sections in a manner to facilitate convenient collapse and erection of the carrier. The end panel sections are integrally and foldably connected to the adjacent ends of the side panels and the center partition structure, extend downwardly to the erected bottom panel, and may be provided with inclined top edges extending above the top edges of the side panels. These carriers may be made to provide six or eight full partitioned bottle receiving cells and are designed to be fabricated from one-piece blanks cut and scored in a manner to permit economies in the use of stock sheet material, and to permit high speed gluing and folding assembly of the prepared blanks into collapsed carriers at economical cost.

While certain novel features of this invention have been disclosed herein and are pointed out in the claims, it will be understood that various omissions, substitutions and changes may be made by those skilled in the art without departing from the spirit of this invention.

What is claimed is:

1. A multi-cell twin-compartmented bottle carrier formed from a single blank of sheet material having a bottom panel formed by a pair of foldably connected bottom sections, a pair of side panels integrally hinged to the opposite side edges of the bottom panel, a pair of end panel sections at each end of the carrier integrally hinged to the adjacent end edges of the side panels, a center partition panel integrally hinged to one of said end panel sections and extending medially of the carrier for a distance equal to at least one-half of its longitudinal length, a center partition section integrally hinged to each of the other three end panel sections and a center partition liner section integrally hinged along a lower edge portion of said center partition panel and upfolded in fixedly secured relation to the adjacent face thereof, adjacent portions of said center partition panel, center partition sections and center partition liner section being secured together to provide a center divider extending substantially down to the erected bottom panel for the full length of the carrier and defining the twin compartments thereof, a plurality of cross partition sections in each of said twin compartments whose lower ends extend substantially down to the erected bottom panel to thereby provide a plurality of bottle receiving cells, each of said cross partition sections being foldably connected along one vertical edge thereof to the adjacent center partition structure and being foldably connected at the other vertical edge thereof to the inside face of the adjacent side panel, one of said twin compartments having an end bottle receiving cell defined by the adjacent end center partition section which is secured in overlapping relation to the adjacent face of said center partition panel and whose longitudinal length corresponds to the length of a single bottle receiving cell, a cross partition section integrally hinged along its inner vertical edge to the innermost vertical edge of said center partition section, and attaching means integrally hinged along the outer vertical edge of said cross partition section and secured to the inside face of the adjacent side panel, said other twin compartment having an adjacent end bottle receiving cell whose formation includes a cross partition section integrally hinged along its inner vertical edge to said center partition liner section and integrally hinged along its outer vertical edge to an attaching member secured to the inside face of the adjacent side panel, a single ply handle core portion presenting a finger insertion cut-out therein formed by interfitting extensions projecting above the top edge of the adjacent side panels and integral with said center partition panel and one of said end center partition sections at the other end of the carrier, and a pair of handle forming sections extending substantially the full length of the carrier and secured in overlapping relation to said handle core portion, at least one of said handle forming sections being integrally hinged at one end thereof to the adjacent end edge portion of said center partition panel.

2. A multi-cell twin-compartmented bottle carrier formed from a single blank of sheet material having a bottom panel formed by a pair of foldably connected bottom sections, a pair of side panels integrally hinged to the opposite side edges of the bottom panel, a pair of end panel sections at each end of the carrier integrally hinged to the adjacent end edges of the side panels, a center partition panel integrally hinged to one of said end panel sections and extending medially of the carrier for a distance equal to at least one-half of its longitudinal length, a center partition section integrally hinged to each of the other three end panel sections and a center partition liner section integrally hinged along a lower edge portion of said center partition panel and upfolded in fixedly secured relation to the adjacent face thereof, adjacent portions of said center partition panel, center partition sections and center partition liner sections being secured together to provide a center divider extending substantially down to the erected bottom panel for the full length of the carrier and defining the twin compartments thereof, a plurality of cross partition section in each of said twin compartments whose lower ends extend substantially down to the erected bottom panel to thereby provide a plurality of bottle receiving cells, each of said cross partition sections being foldably connected along one vertical edge thereof to the adjacent center partition structure and being foldably connected at the other vertical edge thereof to the inside face of the adjacent side panel, one of said twin compartments having an end bottle receiving cell whose formation includes the end center partition section which is secured in overlapping relation to the adjacent face of said center partition panel and whose longitudinal length corresponds to the length of a single bottle receiving cell, a cross partition section integrally hinged along its inner vertical edge to the innermost vertical edge of said last-named center partition section, and an attached member integrally hinged along the outer vertical edge of said cross partition section and secured to the inside face of the adjacent side panel, said other twin compartment having an adjacent end bottle receiving cell whose formation includes a pair of cross partition sections integrally hinged along their inner vertical edges to the opposite end edges of said center partition liner section and integrally hinged along its outer vertical edge to attaching means secured to the inside face of the adjacent side panel, a handle core portion which includes an upper extension of said center partition panel having a finger insertion cut-out therein and an upper extension of one of said end panel sections at the other end of the carrier, said upper extensions projecting above the top edge of the adjacent side panels, and a pair of handle forming sections extending substantially the full length of the carrier and secured in overlapping relation to said handle core portion, at least one of said handle forming sections being integrally hinged at one end thereof to the adjacent end edge portion of said center partition panel.

3. A bottle carrier forming blank which includes, a collapsible bottom panel, a pair of side panels integrally hinged to the opposite longitudinal side edges of said bottle panel, a first pair of end wings extending from adjacent ends of said side panels and each including an end panel section integrally hinged by a vertical score to the adjacent end edge of the side panel and a center partition section integrally hinged by a vertical score to the adjacent end panel section, a second pair of end wings extending from the opposite ends of said side panels and an intermediate wing extending between said second pair of end wings, one of said second pair of end wings including an end panel section integrally hinged by a vertical score to the adjacent end edge of one side panel and a center partition panel integrally hinged by a vertical score to said end panel section and having a longitudinal length which is greater than one-half the length of said side panels, the other end wing of said second pair of end wings including an end panel section integrally hinged by a vertical score to the adjacent end edge of the other side panel, a center partition section having a longitudinal length corresponding to the length of a single cell integrally hinged to the other vertical edge of said end panel section, a cross partition section having a longitudinal length corresponding to the width of a single cell integrally hinged to the other vertical edge of said center partition section, and a side panel securing member integrally hinged by a vertical score to said cross partition section, said intermediate wing including a center partition liner section integrally hinged by a longitudinal score to a portion of the lower edge of said center partition panel and designed to be folded in overlying relation thereto, a pair of cross partition sections integrally hinged to the opposite vertical edges of said center partition liner section and side panel securing flaps integrally hinged to the other vertical edges of said cross partition sections, the cross partition sections and the side panels securing flaps associated with said intermediate wing having the longitudinal edges thereof separated from the adjacent second pair of end wings, said center partition panel having an upper extension presenting a finger insertion cut-out therein projecting above the top edge of the adjacent panel, one of said center partition sections extending from the other end of the blank also having an upper extension projecting above the top edge of the adjacent side panel, said upper extensions together providing a handle core portion when the carrier is assembled, and a handle flap having a length approximately corresponding to the length of the side panels and designed to overlap said end extensions when the carrier is assembled, said handle flap being integrally hinged at one end thereof to an adjacent vertical edge portion of said center partition panel and substantially separated from the adjacent side panel and end panel sections.

References Cited in the file of this patent

UNITED STATES PATENTS

| 1,157,712 | Miller | Oct. 26, 1915 |
| 2,163,290 | Powell | June 20, 1939 |
| 2,345,746 | Goodyear | Apr. 4, 1944 |
| 2,525,686 | Kowal | Oct. 10, 1950 |
| 2,532,446 | Hall | Dec. 5, 1950 |
| 2,535,741 | Lighter | Dec. 26, 1950 |
| 2,537,615 | Arneson | Jan. 9, 1951 |
| 2,584,658 | Arneson | Feb. 5, 1952 |
| 2,634,043 | Arneson | Apr. 7, 1953 |
| 2,661,140 | Arneson | Dec. 1, 1953 |
| 2,687,232 | Arneson | Aug. 24, 1954 |
| 2,696,942 | Ringler | Dec. 14, 1954 |